United States Patent
Daum et al.

(10) Patent No.: US 7,801,405 B2
(45) Date of Patent: Sep. 21, 2010

(54) METHOD AND DEVICE FOR GENERATING A STRUCTURE-FREE FIBERSCOPIC PICTURE

(75) Inventors: Volker Daum, Erlangen (DE); Klaus Spinnler, Erlangen (DE); Robert Couronné, Erlangen (DE); Matthias Elter, Erlangen (DE); Stephan Rupp, Nuremberg (DE); Christian Winter, Uttenreuth (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 12/282,697

(22) PCT Filed: Mar. 13, 2007

(86) PCT No.: PCT/EP2007/002218

§ 371 (c)(1),
(2), (4) Date: Sep. 12, 2008

(87) PCT Pub. No.: WO2007/104542

PCT Pub. Date: Sep. 20, 2007

(65) Prior Publication Data

US 2009/0092363 A1    Apr. 9, 2009

(30) Foreign Application Priority Data

Mar. 14, 2006 (JP) ............... 10 2006 011 707

(51) Int. Cl.
*G02B 6/06* (2006.01)

(52) U.S. Cl. .......... 385/116; 385/115; 385/117
(58) Field of Classification Search .......... 385/115–118
See application file for complete search history.

(56) References Cited

U.S. PATENT DOCUMENTS 4,163,148 A * 7/1979 Fritsche et al. ........... 250/201.2

(Continued)

FOREIGN PATENT DOCUMENTS

WO       00/67060 A1    11/2000

(Continued)

OTHER PUBLICATIONS

Official communication issued in the International Application No. PCT/EP2007/002218, mailed on Aug. 9, 2007.

(Continued)

*Primary Examiner*—Charlie Peng
*Assistant Examiner*—Eric Wong
(74) *Attorney, Agent, or Firm*—Keating & Bennett, LLP

(57) ABSTRACT

An image free from interfering structures may be generated by means of a fiber bundle of several optical fibers, when for the system of fiber bundle and sensor imaging parameters are provided, which describe the geometrical characteristics of the intensity course generated by each individual optical fiber on the sensor. In image reconstruction, for each individual optical fiber an amplitude value and/or luminosity information may be generated by fitting a function of the amplitude value and the imaging parameters of the respective optical fiber to an intensity picture of the sensor, so that an optimum amplitude and/or luminosity value may be generated considering the geometrical imaging characteristics for each individual optical fiber.

15 Claims, 6 Drawing Sheets

U.S. PATENT DOCUMENTS

| | | | |
|---|---|---|---|
| 5,515,470 | A | 5/1996 | Eikelmann et al. |
| 5,878,159 | A | 3/1999 | Taleblou et al. |
| 6,288,542 | B1 | 9/2001 | Proska et al. |
| 6,885,801 | B1 | 4/2005 | Shankar et al. |
| 2003/0076571 | A1* | 4/2003 | MacAulay et al. .......... 359/237 |
| 2005/0207668 | A1 | 9/2005 | Perchant et al. |

FOREIGN PATENT DOCUMENTS

| | | |
|---|---|---|
| WO | 2004/019090 A1 | 3/2004 |

OTHER PUBLICATIONS

Dickens et al.: "Method for Depixelating Micro-Endoscopic Images," Society of Photo-Optical Instrumentation Engineers; Optical Engineering; ISSN 0091-3286; vol. 38; No. 11; Nov. 1999, pp. 1836-1842.

Fang et al.: "Methods for Removing 'Honeycomb' Noise of Fiber-Endoscopic Images," Biomedical Photonics and Optoelectronic Imaging; Proceedings of the SPIE; XP002435019; vol. 4224; 2000, pp. 60-63.

Ruprecht et al.: "Deformed Cross-Dissolves for Image Interpolation in Scientific Visualization," The Journal of Visualization and Computer Animation; XP002444319; vol. 5; 1994, pp. 167-181.

* cited by examiner

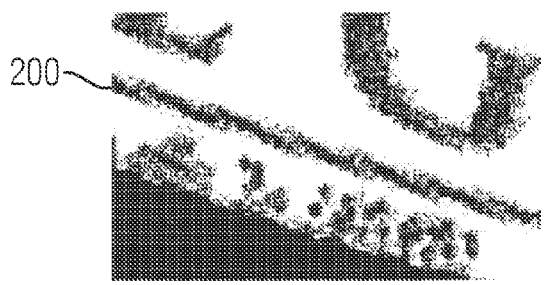 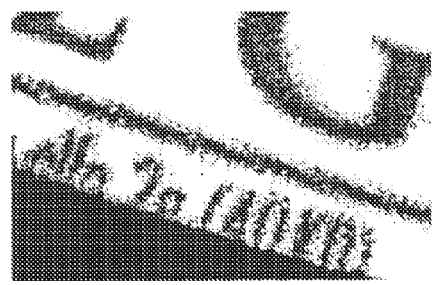
FIGURE 5A          FIGURE 5B
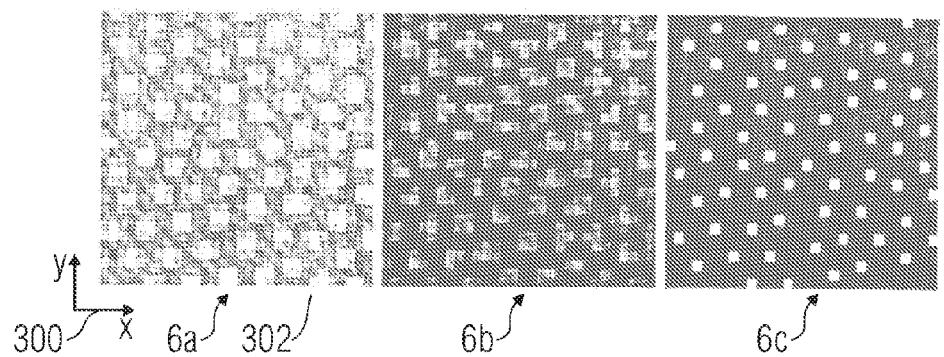
FIGURE 6

METHOD AND DEVICE FOR GENERATING A STRUCTURE-FREE FIBERSCOPIC PICTURE

BACKGROUND OF THE INVENTION

The present invention relates to a device and a method providing the possibility, by means of fiberoptical systems, to generate interference-free images and relates in particular to how the picture of an imaging system, wherein an image is imaged to a sensor by means of a bundle of several orderly fibers, may operate in a suitable way to obtain an image without interfering structures.

Optical systems in which an image is transferred to an imaging sensor via optics, are widely used. Without the imaging use of endoscopes, today many applications among others in the fields of diagnostics, inspection, quality assuring and research would be unthinkable. Here, on the one hand, systems of refractive optics (lens-optical systems) are used, i.e. systems with a rigid arrangement within which the image is transmitted to the sensor by an arrangement of lenses similar to a lens/objective of a camera. On the other hand, fiberoptical systems are used which consist of a great number of orderly light-conducting fibers combined into a bundle, wherein the light is guided to a sensor through the plurality of fibers.

The current preference for lens-optical systems is among others due to the image quality. Wherever a literally more "flexible" use is needed (small, difficult access), high quality, semi-rigid or flexible endoscopes (fiberscopes) with low operating diameters and glass fiber image transmitters have to be used. With the use of such a fiberoptical system of several image transmitters, typically a finite range of the object to be observed is transmitted by each individual image conductor which is used. As with acceptable diameters of the complete fiber bundle no randomly high number of individual fibers is possible and individual fibers cannot be produced with arbitrarily low diameters, hitherto especially the bad resolution of the transmitted image data and the architecture conditioned honeycomb structure of such a system inhibits an adequate use of these devices.

The image transmitter of high quality fiberscopes consists of a regularly arranged bundle of about 5000 to 8000 individual fibers. Compared to the resolution of a conventional full-motion picture camera (e.g. VGA: 640×480>30000 image points and/or pixels), this value is thus far below the threshold value for sensible applications. Typically, the image signal transported by means of the individual fibers is observed using such a conventional full-motion picture camera. The individual optical fibers or optical waveguides, respectively, usually comprise a sheathing, so that from the sheathing interfering structure in the observed image result which may for example be smoothed by low-pass filters or be adaptively reduced by spectral masking. In order to remove the structures introduced by the honeycomb-like structure which strongly interfere the assessment of an image, there are already solutions which interpolate a honeycomb-free image on the basis of luminosity information of the fibers. Likewise, smoothing of the honeycomb-shaped sheathing structures is for example achieved by masking the same in the Fourier space. Maskings here have the disadvantage that they do improve the optical impression of the recorded image, but do not increase the accuracy by which the imaging location may be determined.

One problem which is generally to be solved is dealt with in the German Patent DE 4318140 A1. It is described here, how the positions of the light points may be determined which are imaged by the individual glass fibers to a higher resolution sensor. The Patent Specification shows, how an assignment of the location of the fibers on the input side of the light fiber bundle to the position of the light points caused by the fibers on the sensor is possible on the basis of the determined fiber coordinates. By this method, a wrong imaging is prevented as it is caused by non-parallel fibers in the fiber bundle, this way, however, no resolution increase may be achieved.

Methods of the prior art for image processing an image recorded by means of a fiberoptical system have the disadvantage here that the illustration quality and/or the subjective quality of perception of the pictures is improved, that the same do not cause an actual increase of resolution, however, as for increasing the resolution an introduction of additional (image) information is needed.

If the geometry of the observed scene and/or the occurrence of certain geometrical shapes within the scene is already known beforehand, this knowledge may he introduced for each individual picture in order to actually increase the resolution (e.g. by the application of edge-maintaining filters). If it is for example known that within the picture a straight intensity leap is present, by the suitable application of a filter the course of the edge within the picture may be determined with a higher precision than the resolution of the individual image point. In fiberoptical systems which are used for diagnostics, the object and/or the shape of the object to be observed is usually not known a priori, however, so that such methods are not generally possible.

In principle, the information difference and/or the information redundancy of several successive pictures from varying observation positions or directions may be combined in order to reconstruct an image which has a higher resolution than an individual picture. For conventional video sequences, i.e. successive individual images which consist of a rectangular grid of image points, such methods are used under the collective term "superresolution". In addition to that, there are first approaches for extending the method for increasing the resolution for image points which are present in random grid structures, i.e. in non-rectangular coordinates.

By means of motion detection, thus in principle also for fiberscopes an effective increase of image resolution is possible. For an effective implementation of motion detection algorithms (motion compensation) it is necessitated however, to provide images as a basis for motion detection which are free from artefacts, i.e. from additional structures covering the interesting image content.

As already mentioned above, there are some approaches to make an image, which was recorded by means of a fiberscopic system, free from artefacts and/or to smooth and/or interpolate the honeycomb-shaped structures which are present in systems. Here it is indicated among others in the unpublished German Patent Application No. 10200604006.6, how for a plurality of pixels of a pixel array illuminated by means of a single optical fiber one individual intensity value each may be determined which is used as the image information transmitted by the image transmitter. Image analysis and processing algorithms based on the same are based on the fact that for each individual optical fibre only one single image point is used, so that in additional steps a honeycomb-free image may be generated by an interpolation between the individual image points of the fibre. This interpolated image serves as a basis for the subsequent motion compensation.

Here, the one intensity is used as image information which results from a summation of the pixels which are located in a predetermined radius around a central pixel. The method described there and other methods corresponding to the prior art have the big disadvantage here that the localization of the fiber centres on the sensor may only take place with pixel accuracy, i.e. with the accuracy predetermined by the size of an individual light-sensitive pixel. This deteriorates the applicability of images generated this way for a subsequent motion compensation which is based on generating additional image information by motion detection, wherein the motion detection may be performed with an accuracy which is below the pixel size. A localization of the fiber centers underlying the motion compensation with pixel accuracy thus inevitably leads to a resolution which remains far below the possible theoretical value.

In addition to that, the summation of the light-intensities in a circular range around a central pixel is only restrictedly suitable to describe the complete intensity transmitted by an optical fiber. For example, a deviation from a circular geometry of the light point as it may occur when an individual fiber and/or the fiber bundle comprises an angle relative to the sensor leads to the overall intensity not being determined correctly.

SUMMARY

According to an embodiment a method for generating an image by means of a fiber bundle of a plurality of optical fibers and a sensor which is arranged at a sensor side of the fiber bundle to receive light guided through the optical fibers may have the steps of providing stored imaging parameters of an optical fiber determined by calibration, which describe the geometrical form of an intensity course generated on the sensor by an optical fiber and include the center of the intensity course; capturing an intensity picture by means of the sensor; determining an amplitude value for the optical fiber by fitting a function of the amplitude value to be freely determined and the stored imaging parameters to the intensity picture; and using the amplitude value as image information of the optical fiber to generate the image.

According to an embodiment a method for generating imaging parameters of an optical fiber of a fiber bundle from a plurality of optical fibers, wherein the imaging parameters describe geometrical characteristics of an intensity course generated by the optical fiber on the sensor may have the steps of capturing an intensity distribution generated by the optical fiber on the sensor; determining the imaging parameters by fitting a function of the imaging parameters and an amplitude value to the intensity distribution in a preliminary imaging environment whose extension depends on the nature of the optical fiber; and storing the imaging parameters when location information in the imaging parameters allow a conclusion to the fiber position, which has a predetermined minimum distance to an optical fiber position of the remaining fibers.

According to an embodiment a device for generating an image by means of a fiber bundle of a plurality of optical fibers and a sensor which is arranged at a sensor side of the fiber bundle in order to receive light guided through the optical fibers may have a provider for providing stored imaging parameters of an optical fiber determined by a calibration, which describe the geometrical form of an intensity course generated by the optical fiber on the sensor and include the center of the intensity course; a data capturer for capturing an intensity picture by means of the sensor; an optimizer for determining an amplitude value for the optical fiber by adapting a function of the amplitude value and the stored imaging parameters to the intensity picture; and a processor for using the amplitude value as image information of the optical fiber to generate the image.

According to an embodiment a device for generating imaging parameters of an optical fiber of a fiber bundle of a plurality of optical fibers, which describe geometrical characteristics of an intensity course generated by the optical fiber on a sensor and include the center of the same may have an image capturer for capturing an intensity distribution generated by the optical fiber on the sensor; an optimizer for determining the imaging parameters by adapting a function of an amplitude value and the imaging parameters to the intensity distribution in an environment of a preliminary imaging area whose extension depends on the geometrical nature of the optical fiber; and a storage for storing the imaging parameters when location information in the imaging parameters allow a conclusion to a position of the optical fiber, which has a predetermined minimum distance to a position of the optical fiber of the remaining fibers.

According to an embodiment a computer program may have a program code for performing the method for generating an image by means of a fiber bundle of a plurality of optical fibers and a sensor which is arranged at a sensor side of the fiber bundle to receive light guided through the optical fibers which may have the steps of providing stored imaging parameters of an optical fiber determined by calibration, which describe the geometrical form of an intensity course generated on the sensor by an optical fiber and include the center of the intensity course; capturing an intensity picture by means of the sensor; determining an amplitude value for the optical fiber by fitting a function of the amplitude value to be freely determined and the stored imaging parameters to the intensity picture; and using the amplitude value as image information of the optical fiber to generate the image, when the program runs on a computer.

According to an embodiment a computer program may have a program code for performing the method for generating imaging parameters of an optical fiber of a fiber bundle from a plurality of optical fibers, wherein the imaging parameters describe geometrical characteristics of an intensity course generated by the optical fiber on the sensor, which may have the steps of capturing an intensity distribution generated by the optical fiber on the sensor; determining the imaging parameters by fitting a function of the imaging parameters and an amplitude value to the intensity distribution in a preliminary imaging environment whose extension depends on the nature of the optical fiber; and storing the imaging parameters when location information in the imaging parameters allow a conclusion to the fiber position, which has a predetermined minimum distance to an optical fiber position of the remaining fibers, when the program runs on a computer.

The present invention is here based on the finding that an image free from interfering structures may be generated by means of a fiber bundle of a plurality of fibers and a sensor, if imaging parameters are provided for the system of fiber bundle and sensor which describe the geometrical characteristics of the intensity course generated by each individual optical fiber on the sensor. In an image reconstruction, for each individual fiber an amplitude value and/or luminosity information is generated by a function of the amplitude value and the imaging parameters of the corresponding fibers being adapted to an intensity picture of the sensor so that an optimum amplitude and/or luminosity value may be generated considering the geometrical imaging characteristics for each individual fiber. The imaging parameters here describe the geometrical form of the intensity distribution as it is caused by each individual fiber on the sensor. The imaging parameters may here for example be determined by a calibration to be performed once, wherein the fiber bundle is homogeneously illuminated and wherein a parameterization is adapted to the individual intensity courses of the individual fibers. This has the big advantage that by adapting a parameterization the coordinates of the fiber center and/or the center of the imaging of a fiber on the sensor may be determined with an accuracy which basically depends on the statistics (i.e. on the illumination intensity and the illumination time) and which may by far exceed the accuracy and/or the spatial resolution of the individual pixels of a sensor.

In addition to that, during calibration further information about the form of the intensity distribution may be gained. For example, the spatial extension of the intensity distribution may be described by suitable parameters depending on the distance to the center of the same. This may, for example, be determined by standard deviations of a Gaussian function adapted to the intensity distributions which may be balanced, advantageously be unbalanced, however, i.e. which comprises different extensions in the x and in the y direction on the sensor. By the additional determination of parameters which describe the extension of the intensity distribution on the sensor, further physical effects may be considered like, for example, a tilting of the optical fiber and/or the light fiber relative to the sensor, which causes an elliptical shape of the light intensity on the sensor. According to the invention, thus also in such a case the intensity of the radiation transmitted by means of one single optical fiber may be exactly detected, which is not possible using the methods according to the prior art, which merely sum up the intensity of a number of pixels in a predetermined radius around a central pixel. In one embodiment of the present invention, thus first a calibration is performed in which, as imaging parameters, the characteristic parameters of a two-dimensional Gaussian distribution, i.e. the center (x and y coordinate) and the width of the distribution in two dimensions ($\sigma_x$ and $\sigma_y$) are determined.

This information is used in the processing of images recorded by means of the fiberscopic system to generate an optimized amplitude value for each individual sensor. Here, individually for each optical fiber, for the intensity distributions, whose center and position are already known from the calibration, the parameterization and/or imaging function used for calibration are used to adapt the same in an optimum way to the ones actually measured. The amplitude parameter to be freely determined in the adaptation is thus a measure for the complete light intensity transmitted by the fiber and is used as luminosity information of the respective fiber in the further course of image processing.

By adapting and/or fitting a predetermined calibration function for each individual fiber during image reconstruction it is thus guaranteed, that the actual imaging characteristics of each fiber are used to determine a luminosity value for each fiber. Thus, no luminosity corruptions may occur by summing up wrong pixels actually not belonging to the imaging of the fiber. In addition to that it is guaranteed by the calibration that the position of the fiber centers is known with an accuracy which by far exceeds the size of the individual pixels. The individual pictures thus offer an excellent spatial resolution and amplitude and/or luminosity values determined with greatest possible precision.

Thus generated images are ideally suitable for a subsequent motion compensation.

In one embodiment of the present invention, the image is imaged or mapped, respectively, by means of a fiberoptical system consisting of many individual optical fibers to an imaging sensor such that the intensity course caused by an individual fiber on the surface of the sensor has a spatial extension which is greater than one single light sensitive element and/or pixel of the sensor. This has the advantage, that the mapping or imaging parameters, respectively, which indicate the imaging location of the optical fiber on the sensor may be determined clearly more accurate than the geometrical extension of a pixel, as the same is determined by forming a center and/or fitting a suitable function to the intensity course which is measured by means of several pixels.

The same statistical effect is used in motion compensation, as in the detection of the movement/motion several image points each belonging together are used, so that an estimation of a motion vector from image to image may be performed with an accuracy which exceeds the intrinsic resolution, i.e. the spacings of adjacent image points.

If now a picture is captured by means of the sensor, from an intensity image of the sensor a low resolution image may be calculated which stores image information transmitted by each individual optical fiber in the form of an intensity value. With color pictures, of course, also the storage of three or more intensity values for each optical fiber is possible to obtain the color information. One single low resolution image thus contains a number of image points associated with the individual optical fibers which do not have to be arranged in a rectangular grid. Due to the generation of only one individual image point for each optical fiber, the honeycomb-like structure of the optical fiber arrangement as its visible on the individual sensor pictures with high resolution, is successively suppressed.

By this, in particular the motion detection in subsequent pictures is enabled so that, according to the invention, a number of successive pictures which may he freely determined may he used to detect a movement in locations of the image and/or a translational movement of the overall image and to derive associated motion vectors. As already mentioned above, here the motion estimation may he performed with an accuracy which exceeds the original image resolution.

Here, motion estimation may on the one hand either he performed on the basis of the irregular grid of the individual light points per image transmitter. Alternatively, as the honeycomb structure was already eliminated from the image, on the basis of the irregular grid, a regular, rectangular grating of image points may he generated by interpolation, for example hut not necessarily in the resolution of the used sensor. One possibility of interpolation here is, for example, to gain the intensity values for each pixel of the regular grid by a barycentrical weighting of the three intensity values which are closest to the sampled pixel. The barycentrical weighting is based on the fact that the intensity values of the three closest points, i.e. of those points which form a triangle, within which the sampled pixel is located, are weighted and overlaid with the distance to the corresponding point in order to determine the intensity value for the sampled pixel.

A further example how a continuous image may be interpolated on the basis of the point-shaped luminosity and/or amplitude values is using the Delaunay triangulation and/or using the Voronoi cells dual to the same, as it is explained in more detail further below.

In order to obtain an actual resolution gain/increase, the detected motions of the individual images are backtransformed and overlaid with regard to a freely selectable reference image or reference time. By this, an imaging results, which contains more image points than one individual image. An increase of resolution now results from the fact that the motion vectors may he determined with an accuracy which is higher than the intrinsic resolution and/or the distance of two adjacent image points. In the overlaid image, thus for moving objects several image points exist from different sequential pictures which may he shifted by less than the intrinsic resolution of one single picture, so that in a combination of the pictures an increased resolution of the reconstructed image results. Thus, either a still image may he generated or an image sequence and/or a film in which some individual sequential images each are used to generate an image of the film or the image sequence.

Thus, a possibility is provided, by means of a flexible fiberoptical system, to perform both examinations in which the use of individual high resolution images is needed and also examinations which necessitate observing an action in real time. In particular with endoscopic medical examinations thus new diagnostic possibilities are developed which necessitate the use of an image transmitter which is as thin and flexible as possible together with a high resolution of the images.

Using methods of "resolution increase" for motion picture sequences (superresolution) the information boundary is exceeded whose calculation hitherto related to the reckoning of individual images. This is similar to the behavior of the human eye when working with fiberscopes. Such an increase of resolution opens new interesting fields of application for flexible endoscopy both for personal application of endoscopes e.g. in the field of visual inspection and also for computer-aided further processing of the data. In particular in fields which were hitherto reserved to rigid lens-optical endoscopes due to their high requirements with regard to resolution.

The presented application of resolution increase based on high quality, interference-free individual pictures may be realized within the scope of possibilities of production with virtually any form of construction (resolution, sensor technology for digitalization and the like) of fiberoptical transmission systems and finds application from high quality post-processing of pictures up to a fast real time processing of sequences.

BRIEF DESCRIPTION OF THE DRAWINGS

In the following, embodiments of the present invention are explained in more detail with reference to the accompanying drawings, in which:

FIGS. 5A and 5B show a further example for an achievable resolution increase;

FIG. 6 shows an example for an inventive determination of imaging parameters;

DETAILED DESCRIPTION OF THE INVENTION

Figure 1:
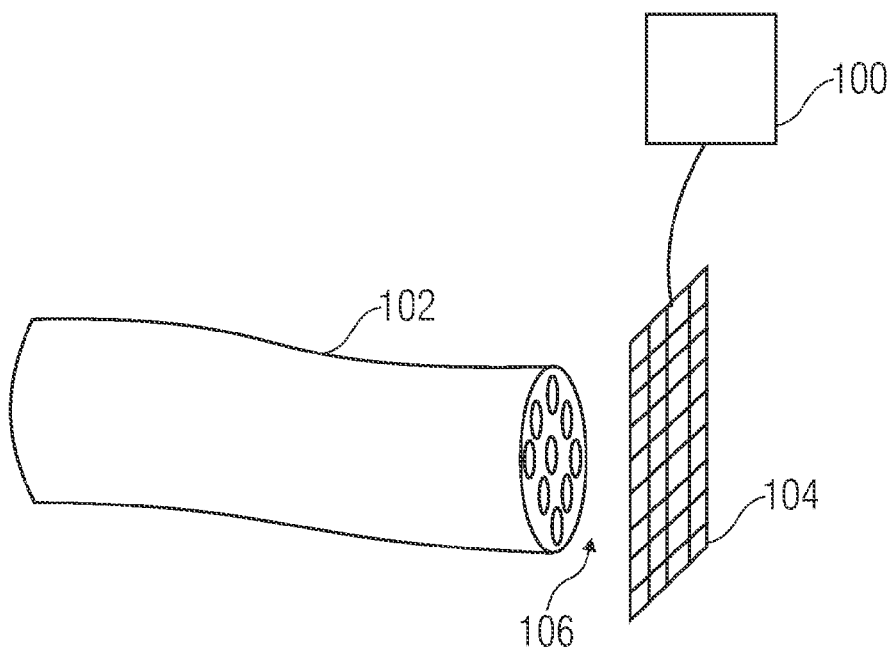
FIG. 1 shows a fiberscopic device for generating a high resolution image.

FIG. 1 shows an example for a system having a device for generating a high resolution image and/or an evaluation means 100. In addition to that, a fiber bundle 102 and a sensor 104 connected to the inventive evaluation means are shown, so that the same may on the one hand control the illumination times of the sensor 104 and on the other hand read out the image data of the sensor 104.

One image or object is imaged from the fiber bundle 102 which consists of a plurality of individual optical fibers 106 on the sensor 104.

The imaging situation of the individual optical fibers on the sensor is illustrated in detail with reference to FIG. 2, in which for reasons of clarity virtually circular intensity distributions (for example intensity distribution 110) are shown as they overlay for example in the square pixel matrix 112 of a CCD sensor.

The functioning of a method for generating a high resolution image is now to be explained in more detail in the following with reference to FIGS. 1 and 2.

Figure 2:
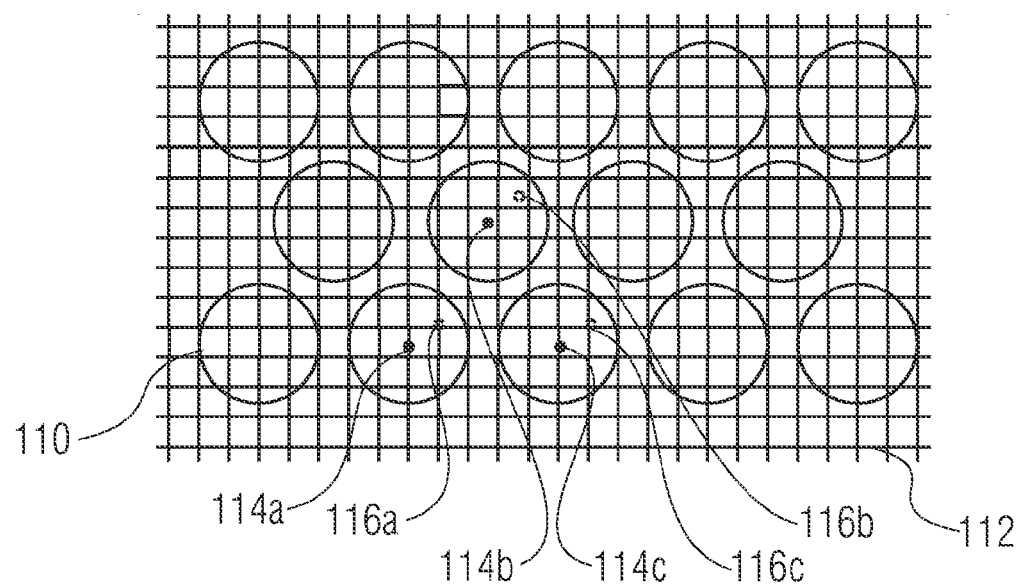
FIG. 2 shows the imaging of light fibers to square light-sensitive pixels.

As it is illustrated in FIG. 2 with reference to the example of the circular intensity distribution 110, an individual light fiber illuminates a plurality of pixels of the pixel matrix 112, wherein individual pixels are completely illuminated by the fiber and the pixels at the edge of the circular intensity distribution 110 are only partially illuminated, so that even with a completely homogeneous illumination of the fiber and with an ideal light transport by the fiber pixels are located at the edges of the fiber image which are only partially illuminated, i.e. detect an intensity which is less than that of the pixel in the center. In addition to that, at the edge of the circular cross section of a light-conducting fiber (optical fiber) the intensity may additionally decrease due to the optical characteristics of the fiber.

According to the inventive method, regarding the arrangement of the fiber bundle 102 and the sensor 104 a set of imaging parameters exist which indicate, among others, the imaging location of the optical fibers on the sensor. The imaging location is here to be regarded so that the same indicates the center of the area irradiated by one single optical fiber on the sensor. As examples for the centers indicated in the position information in FIG. 2 the points 114a, 114b and 114c are shown.

The points 114a to 114c which indicate the center of the light distributions of individual optical fibers and/or fibers on the sensor 104 are here determined in a calibration as it is explained in more detail in the following.

For the actual generation of the high resolution image by means of the fiber bundle 102 and the sensor 104, first, by the device for generating a high resolution image 100, the sensor 104 is controlled such that the same captures a sequence of successive intensity images.

Based on the individual intensity images and the imaging parameters, first of all a low resolution image is derived from each intensity image by the device for generating a high resolution image 100. Here, first of all, for each individual fiber an image point with associated intensity values is determined, so that the resulting low resolution image initially comprises a number of image points which corresponds to the number of optical fibers 106 of the fiber bundle 102. Alternatively, of course, also a lower number of image points may be generated. For the determination of the intensity values corresponding to the imaging locations 114a to 114c it is possible according to the invention to adapt (to fit) suitable parameterizations to the intensity distribution considering the imaging parameters in order to obtain a luminosity and/or amplitude value.

The image generated this way comprises no honeycomb-shaped structure anymore, as it may be seen in FIG. 2, as the sheathings of the individual light fibers and/or the room remaining between the individual optical fibers is not illuminated. An image generated according to the invention thus consists of individual image points corresponding to the fiber centers which comprise no such honeycomb structure and which are not necessarily arranged in a regular rectangular grid. In addition to that, the distance of adjacent image points is greater than the distance of adjacent light-sensitive pixels of the sensor 104.

The image which comprises image points corresponding to the individual fiber centers may now either be directly used further as a low resolution image or, as the honeycomb structure within the image was already removed, a low resolution image may be obtained on the basis of this image by interpolation which has the advantage of a regular arrangement of image points. For this purpose, the image points 114a to 114c may, for example, be sampled using a grid 112 as it is illustrated in FIG. 2, wherein for each pixel of the grid 112 the intensity values are for example gained by an interpolation of the three nearest imaging locations and/or their associated intensity values. In the example of FIG. 2, the three imaging locations 114a to 114c form a triangle, so that for the square pixels within this triangle the intensity values may be gained from a weighted superposition of the three intensity values of the imaging locations 114a to 114c. For example, this weighting may be performed barycentrically, i.e. the intensity values at the imaging locations are weighted with the distance of the respective imaging locations to the pixel to be interpolated and are superpositioned. According to the invention, for example, a suitable parameterization may be fitted to the intensity distribution to obtain a luminosity and/or amplitude value.

Alternatively, a low resolution image may be generated, which has the advantage of regularly arranged pixels, and which thus enables a mathematically more simple postprocessing of the image. Here, the pixel size using which the image of the imaging location is sampled is not predetermined but may be freely selected and may be adapted to the respective requirements and/or conditions.

To now reach an actual increase of resolution, a motion estimation is performed by the device for generating a high resolution image 100 between the individual recordings or pictures, respectively, of the sequence of low resolution images, wherein it is irrelevant, whether the low resolution images comprise rectangularly sampled pixel representations or are located within the grid of the imaging locations. In the motion tracking performed by the device for generating a high resolution image 100, the individual successive low resolution images are compared as to whether the complete image and/or partial areas of the image may be detected in different geometrical locations of successive images, i.e. whether parts of the image and/or the complete image moved relative to the preceding picture on the sensor 104. It is to be noted here, that the imaging locations 114a to 114c of course do not move on the sensor 104, as the fiber bundle 102 is arranged rigidly with regard to the sensor 104. A movement is thus detected based on light intensities changing at the imaging locations 114a to 114c. If, for example, in two successive pictures, image areas corresponding to each other are identified, which were shifted with respect to each other, a motion vector may be defined, which indicates the motion of the image area from one image to the following image. The relative movement of corresponding image areas may here be determined with an accuracy which exceeds the one of the original image resolution, i.e. of the distance of adjacent imaging locations.

In order to now indeed increase the resolution, the device for generating a high resolution image 100 performs a backtransformation of the full motion objects for example to a preceding image at a reference time and the intensity and/or amplitude values of the individual backtransformed low resolution pictures are overlaid. By this, image areas which changed and/or moved in the course of the sequence of low resolution images have new image points added to the same which do not have to lie within the original image raster due to the increased accuracy of the motion vectors. This situation is illustrated with reference to the dashed image points 116a to 116c in FIG. 2. The image points 116a to 116c which were newly added by the backtransformation and subsequent superposition have the effect as if the object to be observed was observed with a higher resolution in the original image than it is intrinsically enabled by the sensor and/or the arrangement of the sensor and optical fiber.

It is thus enabled by the device for generating a high resolution image 100 to generate a high resolution image by means of processing a sequence of recorded (captured) intensity images under consideration of imaging parameters, wherein the image comprises a higher resolution than an individual intensity image.

The device may here be applied so that either an individual still image is generated or that a continuous sequence of images, i.e. an image sequence or a film having an increased resolution is generated. Here, the number of the individual intensity pictures which are used for the generation of a high resolution image may be freely fitted to the respective circumstances. One criterion may here, for example, be the desired increase of resolution and/or the delay which inevitably occurs due to the recording of several images until a high resolution image is generated. The delay may for example be relevant when a real time monitoring is to be enabled by means of the inventive method, wherein naturally a series of intensity pictures have to be performed and processed until the first high resolution image of the image sequence may be made visible on a screen.

In an extension of the above-described embodiment, the high resolution image may be sampled and/or generated in a randomly selectable resolution, wherein the sampling grid may, for example, correspond to the physical resolution of a screen for illustrating the result.

Figure 3:
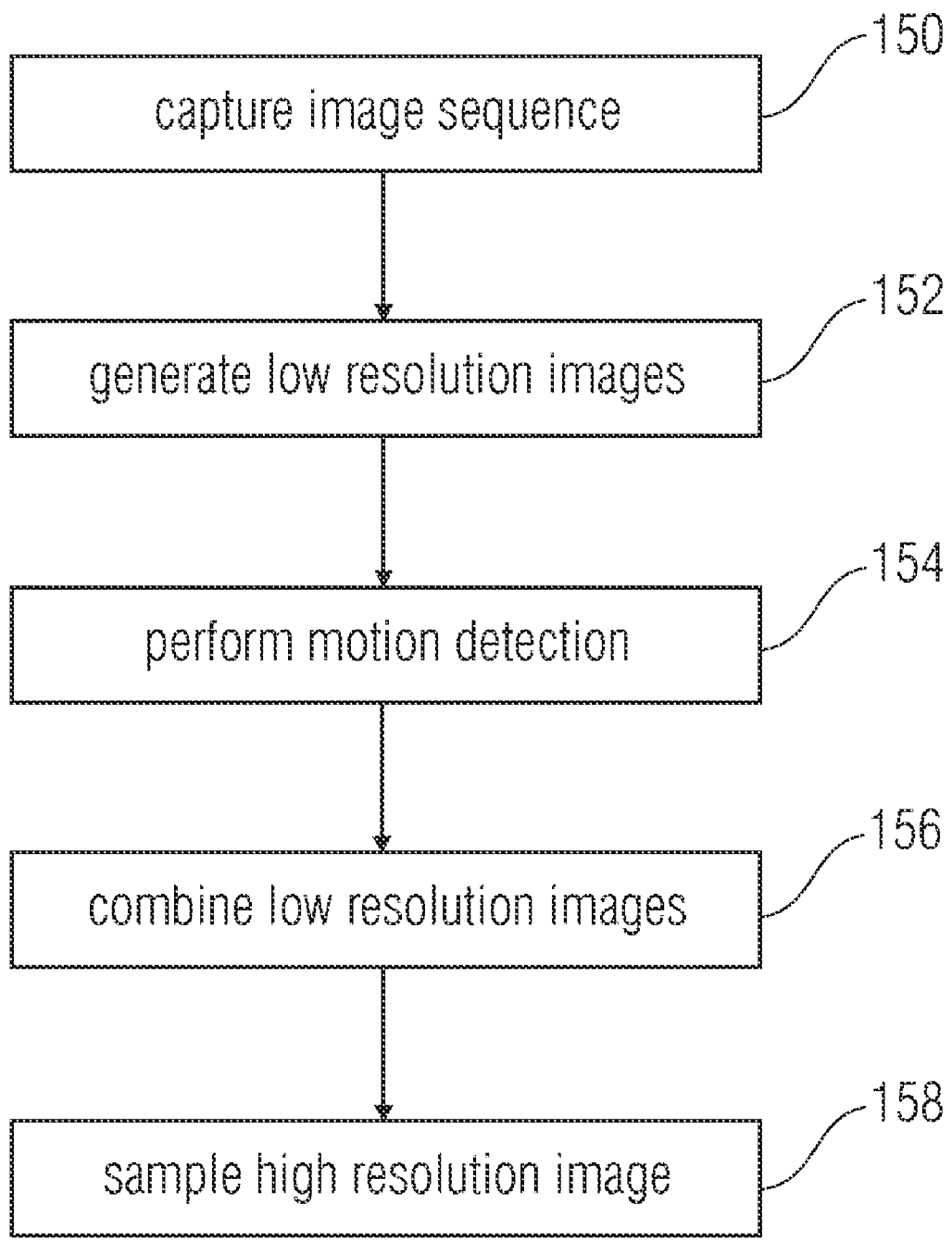
FIG. 3 shows a flow chart for a method for generating high resolution images.

With reference to FIG. 3, in the following again the successive steps for performing the method for increasing the resolution are illustrated. In order to generate a high resolution image, first of all in an image recording step 150 a sequence of intensity images is to be recorded. As described above, in the generation step 152 low resolution images are generated from the intensity images with the help of imaging parameters which, for example, indicate a imaging location of the optical fibers 106 on the sensor 104. In the subsequent motion detection step 154 successive low resolution images are analyzed and for full motion parts of the image and/or for the case that the complete image moved, relative motion vectors are determined. In the synthesis step 156 the high resolution image is combined from the low resolution images by backtransforming the detected movements and overlaying the backtransformed images.

In an additional, optional sampling step 158 the generated high resolution image may for example be sampled in a rectangular coordinate grid to output the same to an external display device.

Figure 4E:
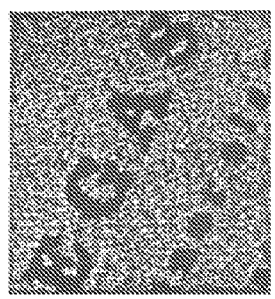
FIGS. 4A to 4E show an example for an increase of resolution determined by experiments.
Figure 4D:
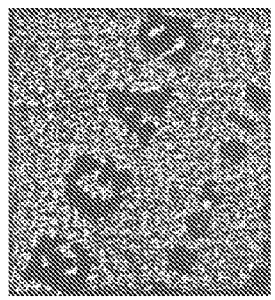
Figure 4C:
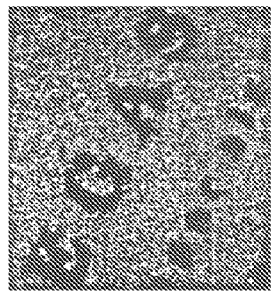
Figure 4B:
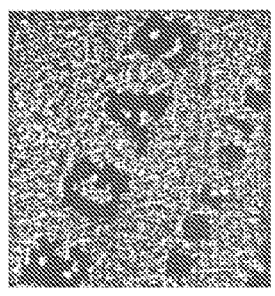
Figure 4A:

FIGS. 4A to 4D show experimental results as they may be obtained by applying a method for increasing the resolution. The result of a processing of pictures from a flexible endoscope having glass fiber image transmitters is illustrated. Here, FIG. 4A shows the original image plotted by the sensor at the proximal end of the endoscope. FIG. 4E shows, how an image may be generated by barycentrical interpolation, whose honeycomb pattern is reduced and/or suppressed.

FIGS. 4C to 4E show, from left to right, the application of the method with an increasing complexity. In FIG. 4C the result when using five individual images, in FIG. 4D the result when using ten individual images and in FIG. 4E the result when using fifteen individual images for increasing the resolution is illustrated. As it may be seen with reference to the figures, the resolution becomes continuously better when increasing the number of low resolution images used for the determination of the high resolution image.

FIGS. 5A and 5B show an example how the legibility of a text which was recorded by means of a fiberoptical endoscope may be improved by the application of the method. In FIG. 5A, here an enlarged section of a picture after the reduction of the honeycomb structure is illustrated, wherein FIG. 52 shows the same section after the application of the method for a motion compensation. As it may clearly be seen with reference to the two figures, by the motion detection method the resolution may be increased in real, as parts of the text only become legible in FIG. 5R. The method here has the big advantage, that information about the structure of the reckoned item do not have to be known in order to obtain the resolution increase. In case of a straight line 200, as it is for example illustrated in FIG. 5A, a resolution increase would also be possible by a filter tuned to the detection of straight lines which could find the straight line 200 within the image section with a high accuracy by fitting a suitable function. Such methods would, however, not be able to detect the round shapes and complicated patterns of the characters, as it is the case here.

As it may be seen with reference to FIGS. 4A to 5B, the motion compensation was examined and compared with different image material comprising legible and illegible, structured and unstructured and transversally and/or longitudinally shifted contents. Scenes with extremely little structure are refrained from which provide no contribution to motion detection and thus offer no approach for the increase of spatial resolution. In particular the number of used images around a base image and the different structure within the image were examined as influential variables with regard to subjective perception. Implementations of the method for postprocessing fiberscopic image material confirm the clear increase of details (legible text, edges, structures) in the combination of several individual pictures.

The method is thus suitable both for a transversal and also for a longitudinal movement of the endoscope tip and is robust with regard to a non-homogenous movement within the pictures.

The above-described method may be classified and/or designated as a resolution increase in the location area with an interpolation of unequally distributed rasters. A modular separation between the localization of image information, the interpolated motion estimation, the generation of a high resolution grid and its Cartesian sampling with a barycentrical extension of support locations enables the separate use and conversion of the respectively used methods in software and hardware. The adaptation and optimization of the method to any grid structures for gaining high resolution image information offers three substantial advantages:

1. For the generation of the higher resolution image instead of interpolated Cartesian pictures, as they are conventionally present due to the resolution difference between video camera and glass fiber bundle, directly the luminosities at the fiber centers are used.
2. Deviations conditioned by construction of the hexagonal structure of a fiber bundle have no negative influence on the result.
3. The method is robust against non-global movements as they are observed in particular with wide angle lenses in endoscopy.

The method may be realized by a parallelization of process steps in signal processor technology and thus be used as a module for increasing the resolution directly between the digitizing sensorics after fiberoptics and a display/reproduction or postprocessing.

Motion compensation methods for a resolution increase may be characterized by the combination of the five steps subsequently described:

1. Localization of the fiber centers of the image transmitter.
2. Generation of neighborhood relationships, for example by triangulation and provision as an orderly triangular grid.
3. Calculation of the global and/or local motion fields between the pictures of a section of the fiberscopic image sequence. This step may be supported by a preprocessing step, e.g. interpolation of the image material.
4. Combination of a base image with the intensities of the fiber centers of further images of the section of the image sequence, for example by introducing the motion-inverted intensities of fiber centers as support locations into a prepared HR grid (high resolution grid).
5. Conversion of the combined high resolution image into the needed illustration, e.g. by Cartestan sampling into an image with rectangularly distributed/arranged image points. The interpolation may be rendered by a barycentrical weighting of the gray value distribution between the contained support locations.

Figure 7:
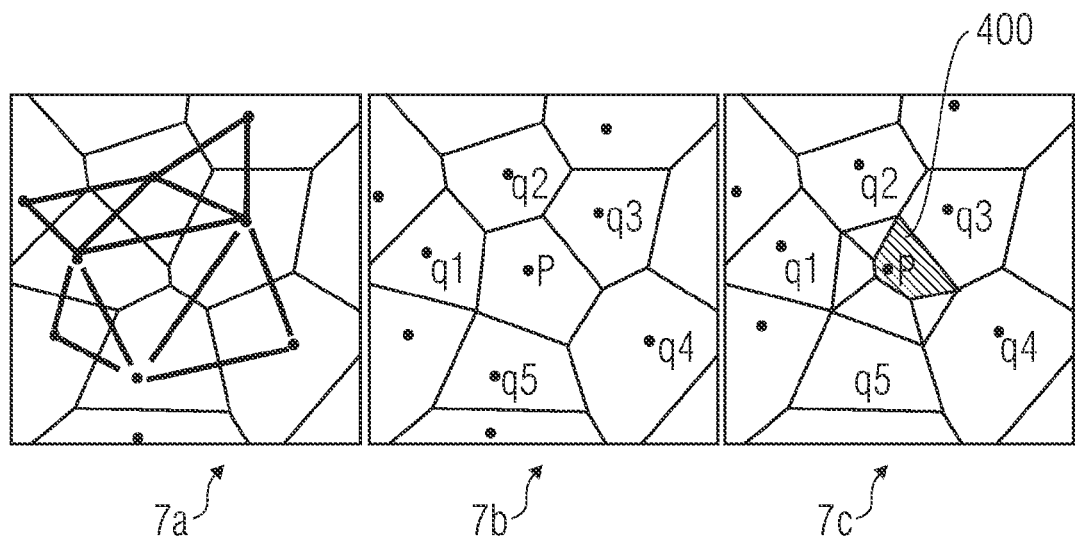
FIG. 7 shows an example of an inventive interpolation method for generating structure-free images.

In the following, with reference to FIGS. 6 to 8 it is to be described exemplarily in detail how low resolution images which are free from artefacts and/or interfering structures may be generated according to the invention, as it is for example requested in step 152 of the method for motion compensation.

Here, according to the invention, in contrast to the method corresponding to the prior art, the actual physical characteristics of a fiberscopic image capturing system are used to remove the image artefacts and/or the interfering structures in an efficient way, wherein simultaneously the complete image information is maintained.

Here, the inventive method for generating a structure-free fiberscopic image is based on the fact that first of all a calibration of the fiberscopic system is performed and that on the basis of the findings gained during calibration image reconstruction steps are performed in real time. The calibration only has to be performed once, the reconstruction, however, is needed for each individual image (frame) of a stream of images. It is here among others the aim of the calibration to determine the centers of all light-conducting fibers with an accuracy which is higher than the size of the pixels of a sensor (i.e. with subpixel accuracy). An image used for the calibration may here for example be gained by imaging a homogeneous white area (for example a sheet of paper). During image reconstruction an artefact-free output image is reconstructed which is constructed on the basis of the intensity values which are gained at the locations of the centers of the optical fibers mentioned with subpixel accuracy. Here, according to one embodiment of the present invention, the position of the centers of the optical fibers is determined in three stages by means of a calibration image. First, potential candidate points for the position of the center of the optical fiber are determined with pixel accuracy (i.e. with a spatial resolution which corresponds to the physical size of the pixels of the sensor). A significance value which indicates how well a two-dimensional Gaussian parameterization with predetermined parameters describes the intensity distribution around the candidate point is associated to each candidate point.

After that, in order of decreasing significance, at each candidate point an unbalanced two-dimensional Gaussian parameterization is adapted to the intensity picture captured by means of the sensor (for example using nonlinear optimization). The adaptation indicates a position of the optical fiber center with subpixel accuracy, wherein in addition to that for each adaptation which is executed a further significance value is obtained. The actual centers of the optical fibers are then determined from the group of the candidate points based on the significant values, where in addition to that a distance criterion is used which describes the minimum practical distance of two adjacent centers of optical fibers. Here, the group of adjacent optical fibers which are considered for the application of the distance criterion may, for example, be determined by a Delaunay triangulation of the centers of the optical fibers which may apart from that also serve as a basis for a subsequent image reconstruction.

In the following, the step of calibration and the multistage process for determining an optical fiber center are explained in more detail. Here, the argumentation is in the following explained with reference to FIG. 6, which shows three pictures, wherein the left picture 6a is a two-dimensional intensity image, as it is captured by a fiber bundle during the calibration by means of a pixel sensor. As it may be seen in FIG. 6a, the structures associated with the individual optical fibers may clearly be seen, the exact position of the center of the intensity distribution may not be determined, however, as by each fiber several pixels are illuminated with a high intensity.

The highlights in the calibration image (white illuminated area) are here obviously candidate points for centers of optical fibers. The simplest possible approach for the identification of candidate points on the basis of their luminosity (performing a threshold value comparison) fails, however, if a calibration image comprises a non-uniform luminosity distribution. Thus, first of all the candidate points are selected based on their luminosity which is put in relation to the luminosity of the local neighborhood of the candidate point. For this purpose, for example a symmetrical rectangular neighborhood N is used. Here, the size of the neighborhood for example depends on the diameter of one individual optical fiber which is approximately constant for all optical fibers of a fiber bundle. For the coordinates used in the following consideration, in FIG. 6a the coordinate system 300 is defined, so that a coordinate in the coordinate system 300 may be associated with individual pixels. For the temporary determination of candidate points, first of all for each position (X, Y) in the calibration image the minimum and maximum intensity $I_{min}$ and $I_{max}$ within the neighborhood N (X, Y) are determined and their coordinates $(X_{min}, Y_{min})$ and $(X_{max}, Y_{max})$ are localized. Using a local intensity criterion (a minimum intensity difference) $D_{min}$, the point $(X_{max}, Y_{max})$ is identified as the candidate point for a center of an optical fiber exactly when $I_{max} - I_{min} > D_{min}$.

If, according to the above implementations, all candidate points for the calibration picture are determined, for each individual one of the candidate points a significance value is determined, which indicates how well a two-dimensional symmetrical Gaussian distribution describes the data in the environment of the candidate points by comparing the environment of the candidate points to the Gaussian distribution (template matching). An example environment (template window) which corresponds to a neighborhood N is for this purpose filled with the discrete values of a symmetrical two-dimensional Gaussian distribution which is centered around the center of the example environment. For each example window, each of which corresponds to a candidate point $P_i$, a significance value $s(p_i)$ is calculated which corresponds to the conventional PMS metrics:

$$s(p_i) = \sum_{N(p_i)} (T(x, y) - I(x, y))^2, \quad (1).$$

Here, T(x,y) and I(x,y) correspond to the intensities of the individual pixels at the positions (x,y) of the example window and the neighborhood N ($p_i$) of the candidate point $p_i$. Here, points with a lower corresponding significance value and/or their environments correspond to the example environment better. This means, the probability that the corresponding candidate point $p_i$ is in the proximity of the actual center of the optical fiber is higher for points with a low significance value than for points with a high significance value. FIG. 1b shows the result of the above operation and thus the candidate points and the associated significance values in a gray level illustration.

In a step of adapting and/or determining the centers of the optical fibers now the candidate points are evaluated again by fitting two-dimensional non-symmetrical Gaussian distributions to the environments of the candidate points. A two-dimensional, non-symmetrical Gaussian distribution f(x,y;v) is defined by a parameter vector v ($\mu_x$, $\mu_y$, $\sigma_x$, $\sigma_y$, a, which contains the center ($\mu_x$, $\mu_y$) of the Gaussian distribution, the standard deviations in the x and y direction $\sigma_x$, $\sigma_y$ and an amplitude and/or an amplitude value a. The complete Gaussian function is thus written as follows:

$$f(x, y; v) = a \cdot \exp\left(-\frac{(x-\mu_x)^2}{2\sigma_x^2} - \frac{(y-\mu_y)^2}{2\sigma_y^2}\right). \quad (2)$$

If, first of all, the parameters $\mu_x$, $\mu_y$ are determined so that f(x,y;v) is centered around the candidate point $p_i$, the above function may be fitted to the neighborhood N ($p_i$) by a non-linear optimization of the following square distance problem by variation the vector v:

$$r(p_i) = \sum_{N(p_i)} (f(x, y; v) - I(x, y))^2. \quad (3)$$

For minimizing the value $r(p_i)$ also referred to as residuum, different minimization algorithms may be used, like for example the Levenberg-Marquardt method. With a converging optimization for a candidate point $p_i$, an improved subpixel-accurate position ($\mu_x$, $\mu_y$) of the center of the optical fiber is obtained as the center of the Gaussian distribution, wherein $r(p_i)$ may be interpreted as a new refined significance value for the candidate point ($p_i$).

The final selection of the center of each optical fiber takes place, as mentioned above, under additional use of a distance criterion for the use of which first of all the determination of the other centers of optical fibers is needed, which are the nearest neighbors of the reckoned candidate point ($p_i$). Here, for example, the Delaunay triangulation is used, which provides the natural neighbors directly adjacent to the candidate point.

In the Delaunay triangulation for an amount P of points in one plane a triangulation D (P) of P is performed such that there is no single point in P which lies within the circumference of a single triangle of the triangulation. A Delaunay triangulation here maximizes the minimum angle occurring within each triangle of all triangles of the triangulation. The Voronoi diagram V(P) is closely connected to the concept of the Delaunay triangulation and describes the dual graph for the triangulation.

The concept of the Delaunay triangulation and/or of the Voronoi graph is described in the following with reference to FIG. 7. In the further course, reference will in particular be made to how the natural coordinates defined by use of the Voronoi illustration may be used to generate a continuous intensity image having a higher number of image points from individual points having a certain luminosity and/or intensity.

FIG. 7a shows a number of points as an example, as well as the Delaunay triangulation fitted to the distribution of points which is represented by both lines which surround the triangles of a triangulation. In addition to that, all points in FIG. 7a are arranged within areas, wherein the so-called Voronoi cells surrounding the individual points are generated on the basis of the triangulation by forming boundary lines which bound the Voronoi cells by constructing a mid perpendicular for each individual connecting line between two points which resulted from triangulation, as it may be seen in FIG. 7a.

For the calibration, i.e. the final selection of the coordinate pairs ($\mu_x$, $\mu_y$), which indicate the final position of the centers of the optical fibers, the Delaunay triangulation is relevant in so far as the same directly provides the natural neighbors of each point. The actual or natural neighbors, respectively, of a point are here defined by the fact that each natural neighbor $q_i$ of a point $p_i$ is connected to the point $p_i$ by a connecting and/or boundary tine of a triangle of the triangulation.

In FIG. 7b, the Voronci structure of the situation of FIG. 7a is illustrated, wherein an additionally inserted pointed p is illustrated in the center of the distribution of points, whose natural neighbors are points $q_1 \ldots q_5$. A candidate point and/or a coordinate pair ($\mu_x$, $\mu_y$) is accepted as the center of an optical fiber in the present embodiment of the present invention when the same comprises the highest significance value $r(p_i)$ of the available candidates for the corresponding optical fiber and additionally fulfills a distance condition.

The distance condition is basically based on the fact that the diameter of the individual optical fibers $d_{fiber}$ is on the whole constant for all fibers of an endoscope and/or a fiber bundle. As the optical fibers may not overlap spatially for physical reasons, a minimum distance $d_{min}$ between two detected centers of optical fibers may be defined, which still seems to be plausible (for example $d_{min} = 0.9 \times d_{fiber}$). During the calibration, continuously a Delaunay triangulation D(P) is set up on the basis of the data points. Here, the order in which the individual points are inserted into the triangulation is determined by the significance value, wherein candidates with a high significance (low calculated square of the distance), i.e. a high probability to be the actual center of the fiber, are inserted first. If such a point of high significance has been inserted and if the same passes the distance criterion, then this point is regarded as the center of the respective optical fiber. It is here guaranteed by the distance criterion, that only one single point per optical fiber (i.e. one single center) is inserted into the Delaunay triangulation. Mathematically, the distance criterion may be described as follows:

Let $D_{q_i}$ be the distance of the candidate point which is to be inserted into the triangulation, to its natural neighbor $q_i$. The candidate point is inserted into the triangulation if, and only if, it applies to all i:

$$\forall_i : d_{g_i} \leq d_{min}$$

After the calibration of the fiberscopic system, for each individual fiber a tuple of four values is available as an imaging parameter. These are the coordinates of the center of the optical fiber $\mu_x$ and $\mu_y$ and the width of the two-dimensional, asymmetrical Gaussian distribution $\sigma_x$ and $\sigma_y$.

As a result of the calibration FIG. 6c shows the detected fiber centers for the picture of FIG. 6a.

As these two parameters describe geometrical characteristics of the system of sensor and optical fiber, i.e. the exact imaging location and the geometrical extension of the intensity distribution caused by an individual fiber, these parameters do not change over time. On the basis of the once determined parameters, thus the transmitted intensity and/or the transmitted amplitude value of each individual optical fiber may be exactly determined during image capturing and analysis.

For image reconstruction, intensity information transmitted by one individual optical fiber and corresponding to the amplitude a of the two-dimensional Gaussian distribution describing the intensity distribution of an individual optical fiber on the sensor has to be determined. If individual, precisely determined intensity and/or amplitude values have been determined for each individual fiber, artefact-free images may be generated by transferring the intensity information at the centers of the optical fibers into a higher resolution grid by interpolation, so that a continuous image representation may be achieved in the higher resolution grid, as will be explained in more detail below. For this purpose, first of all the exact determination of the amplitude value a from equation 1 is needed.

During calibration, the characteristics of each optical fiber, the parameter vector v, were gained. Both, the center of the optical fiber ($\mu_x$, $\mu_y$) and the standard deviations $\sigma_x$ and $\sigma_y$ are temporally constant, independent of which image content is captured by the fiberscope. The amplitude value a, however, changes with a changing image content and has to newly determined for each picture. This may, for example, be done by solving a simple minimum square of the distance problem (see equation 3):

A good initial value for the parameter a to be determined and/or to be freely fitted is, for example, the intensity I ($\mu_x$, $\mu_y$), which may be gained by a bilinear interpolation at the su pixel-accurate location of the center of the optical fiber ($\mu_x$, $\mu_y$). The minimization of equation 3 may here be done in any suitable way, for example by applying the Newton Rhapson method.

According to the invention, thus only a single free parameter is to be optimized for the determination of the amplitude value, which is possible with little time involved, so that the inventive method may run in real time. Here, the inventive method for determining the amplitude value has the big advantage that the real imaging information present in the form of the imaging parameters is used for the determination of the amplitude value. Ellipsoid intensity distributions on the surface of the sensor may thus be considered sufficiently, as they for example occur if the optical fiber comprises an angle with regard to the surface of the sensor which is unequal 90°.

Based on the intensity data and/or the centers of the intensity distribution gained according to the invention, which correspond to individual optical fibers, and which are determined with a higher precision and a substantially higher accuracy than the size of the individual pixel, now, for example, a motion compensation may be performed for which good success may be expected. Here, in a further embodiment of the present invention, from the discrete image points and the associated amplitude values of the optical fibers a continuous two-dimensional image may be interpolated, wherein in an embodiment of the present invention Voronoi cells are used for the determination of the interpolated intensities, as it is described in the following.

For forming an artefact-free image, i.e. for a suitable interpolation, characteristics of the Voronoi cells may be used. As already mentioned above, the concept of natural neighbors is used to determine adjacent points of points of an irregularly distributed amount of points. The natural neighbors of a point P are here defined as the neighbors of the point P of the Delaunay triangulation of the amount of points P ∪ {x}. This is equivalent to the fact that the natural neighbors are those points of P whose Voronoi cells are cut, when an additional point P is inserted into the Voronoi diagram, as it is for example illustrated with reference to FIG. 7c. If the original points $q_i$ designate the centers of the optical fibers which each transport a certain light intensity, then a Voronoi cell may graphically be regarded as the area and/or the region into which the intensity of the fiber radiates and/or as the area of the object whose light intensity is transmitted by means of the respective fiber.

If V ($q_i$) is the Voronoi cell of the natural neighbor $q_i$ of p and if p apart from that is a point which was additionally inserted into the triangulation, which comprises the Voronoi cell V(p), as it is illustrated in FIG. 7C, then the following reflections may be made. The natural region N(p,$q_i$) is defined as the part of V ($q_i$) which is removed by the Voronoi cell V ($q_i$) from $q_i$ when inserting the point P by the Voronoi cell V(p).

Thus, N(p,$q_i$) is V(p) ∩ H($q_i$). In the following, A($q_i$) designates the area of N(p,$q_i$). The natural coordinate $\lambda_{q_i}(p)$ of $q_i$ is then defined as the area ratio:

$$\lambda_{q_i}(p) = \frac{A(q_i)}{\sum_i A(q_i)}. \quad (4)$$

The hatched area in FIG. 7C around the point P is, for example, the natural area N(p,$q_3$).

The natural coordinates here have the following important characteristics.
1. $\lambda_{q_i}(p)$ is a continuous function of p and is continuously differentiable except for the original data points.
2. $\lambda_{q_i}(p)$ disappears outside the amount of points which enclose the Delaunay simplex which leads to $q_i$.
3. $\lambda_{q_i}(p)$ fulfill the criterion for local coordinates which describes that p is a convex combination of its neighbors $q_i$:

$$p = \sum_i \lambda_{q_i}(p) \cdot q_i.$$

The third above-described criterion, which relates to the characteristic of the local coordinates, may now be used to interpolate the intensity of an additionally inserted image point (pixel) p from the intensities, which were determined at the centers of the optical fibers $q_i$. It has to he noted here, that when adding a point p in the triangulation the natural neighbors $q_i$ of the triangulation whose positions were determined during the triangulation are used for determining the intensity and/or amplitude value I(p). The intensity I(p) is the convex sum of the intensities I ($q_i$):

$$I(p) = \sum_i \lambda_{q_i}(p) \cdot I(q_i).$$

The resulting image is an easily differentiable continuous function of the intensities I(q) which is based on the support locations of the centers of the optical fibers q.

It is to be noted, that finding the natural neighbors of each pixel p and the calculation of the natural coordinates of the pixel is a mime-consuming operation. As, however, both the natural neighbors and also the natural coordinates of a pixel p remain temporally constant as long as the size, i.e. the resolution, of a reconstructed interpolated image is not changed, both the natural neighbors and also the natural coordinates for each combination may only be calculated once and stored in the form of a lookup table. Once this time-consuming calculation is completed, individual images may be reconstructed without problems in real time.

Figure 8:
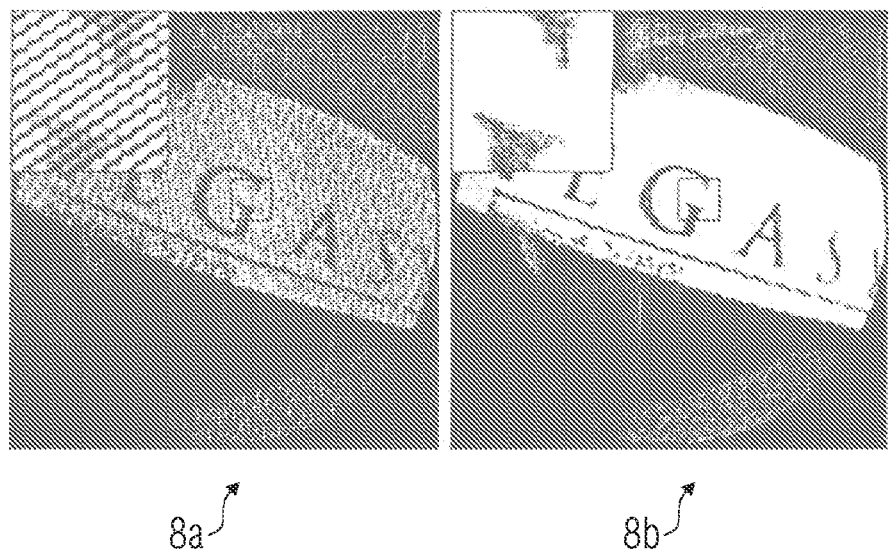
FIG. 8 shows an example for a structure-free image generated according to the invention.

FIG. 8 shows an example how, using this inventive concept, from an artefact-containing image which clearly shows the honeycomb-shaped structure of a fiberscopic untreated picture (FIG. 8a) an artefact-free continuous two-dimensional image (FIG. 8b) may successfully be generated, which is perfectly suitable for example to perform a subsequent motion compensation on the basis of the reconstructed artefact-free image.

Figure 9:
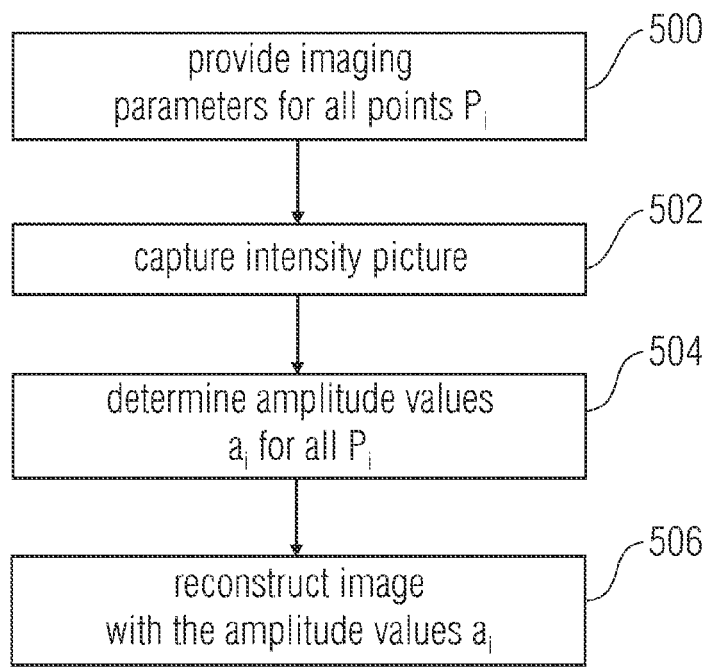
FIG. 9 shows a flow chart for an inventive generation of an image by means of a fiber bundle.

FIG. 9 shows a flow chart in which the basic steps for the inventive generation of an image are illustrated.

Here, in a preparation step 500, first of all the image or imaging parameters, respectively, of an optical fiber are provided, which describe geometrical characteristics of an intensity course generated by the fiber on the sensor.

In the capturing step 502 an intensity picture of the sensor is captured.

In the image processing step 504 an amplitude value for all optical fibers al is determined by adapting a function of the amplitude value and the image parameters to the intensity picture.

In a reconstruction step 506 the amplitude values are used as image information of the individual optical fibers in order to generate the image.

Figure 10:
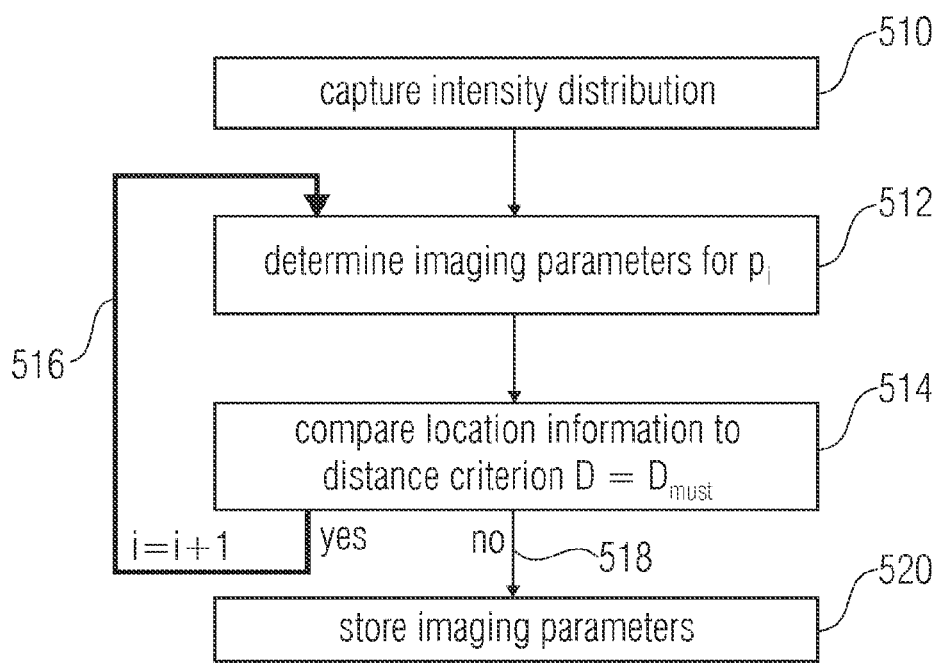
FIG. 10 shows a f low chart for an inventive method for generating imaging parameters of an optical fiber.

FIG. 10 shows a flow chart of an inventive method for generating image parameters of a fiber.

In the image capturing step 510 an intensity distribution generated by the optical fiber on the sensor is captured.

In the fitting step 512, for a candidate point $p_i$ the imaging parameters are determined by fitting a function of the imaging parameters and an amplitude value to the intensity distribution in a preliminary imaging environment whose extension depends on the constitution of the optical fiber.

In the comparison step 514 it is checked whether location information in the imaging parameters allow a conclusion to the optical fiber position which comprises a predetermined minimum distance to an optical fiber position of the remaining optical fibers.

If it is determined, that the minimum distance is undergone, an iteration path is used and imaging parameters for a next candidate point of the optical fiber to be found are determined.

If the minimum distance is not undergone, a memory path 518 is used and the imaging parameters for the candidate point are stored in a storing step 520.

In summary, the present invention describes a concept how using a processing algorithm for fiberscopic pictures, which uses the actual physical characteristics of the fiberscopic image, artefacts and/or unwanted structures within the fiberscopic pictures may be removed without changing the actual image information. Here, in particular by the inventive method the removal of the fiberscopic honeycomb-structure is enabled in real time.

Apart from that i is possible in the application of the inventive method, to use different combinations of fiberscopes and sensors to obtain artefact-free continuous pictures.

Although, in the described embodiments of the present invention, a sampling of images was performed to generate pictures with an orderly grid-like pixel structure from non-orderly pictures by means of barycentrical weightings or Delaunay triangulation, also any other type of sampling is suitable to implement the inventive method.

In addition to that, in the embodiments of the present invention mainly sensors and rectangularly arranged, rectangular light-sensitive areas are illustrated, as it is for example the case with CCDs. Such a requirement is by no means a precondition for the implementation of the inventive method. Although for full-motion image capturing mainly CCDs and CMOS sensors are used, any other light-sensitive sensor arrays are just as well suitable to implement the inventive method like, for example, arrays of photodiodes and other photosensitive elements like photocathodes and photoelectron multipliers.

Although for the determination of the fiber center position, i.e. the imaging locations of the optical fibers on the sensor, an illumination of the fiber bundle is advantageous which is as homogeneous as possible, a determination of the fiber centers may also be performed by means of an inhomogeneous illumination.

Alternatively, for increasing the accuracy, also a deviating a light-sensitivity of individual pixels of the sensor may be considered, which may, for example, additionally be stored in the imaging parameters when the same were gained with a homogeneous illumination of the fiber bundle.

Although the inventive concept was discussed mainly in application to fiberoptical endoscopic systems in the above paragraphs, it is obvious that the same may further be applied anywhere where an increase of resolution of a vignetted image is to be achieved.

Depending on the circumstances, the inventive method for generating a high resolution image may be implemented in hardware or in software. The implementation may take place on a digital storage medium, in particular a floppy disc or a CD having electronically readable control signals which may cooperate with a programmable computer system so that the inventive method for generating a high resolution image is performed. In general, the invention thus also consists in a computer program product having a program code stored on a machine-readable carrier for performing the inventive method, when the computer program product runs on a computer. In other words, the invention may thus also be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for generating an image by means of a fiber bundle of a plurality of optical fibers and a sensor which is arranged at a sensor side of the fiber bundle to receive light guided through the optical fibers, comprising:
    providing stored imaging parameters of an optical fiber which describe geometrical characteristics of an intensity course generated on the sensor by an optical fiber and include the center of the intensity course;
    capturing an intensity picture by means of the sensor;
    determining an amplitude value for the optical fiber by fitting a function of the amplitude value to be freely determined and the stored imaging parameters to the intensity picture; and
    using the amplitude value as image information of the optical fiber to generate the image; wherein
    only the amplitude value is varied in the fitting step.

2. The method according to claim 1, wherein the function is fitted by minimizing a difference between the intensity distribution described by the function and the intensity picture.

3. The method according to claim 2, wherein the square difference of the intensity distribution described by the function and the intensity picture is minimized.

4. The method according to claim 1, wherein the coordinates μx and μy and the widths σx and σy of a two-dimensional Gaussian distribution of the following form:

$$f(x, y; v) = a \cdot \exp\left(-\frac{(x-\mu_x)^2}{2\sigma_x^2} - \frac{(y-\mu_y)^2}{2\sigma_y^2}\right),$$

are provided as imaging parameters; and
    wherein when fitting the function of the amplitude values and the imaging parameters the amplitude value a is varied.

5. The method according to claim 1, comprising a further interpolation step to generate the image from spatially irregularly arranged amplitude values of the optical fibers of the fiber bundle by an interpolation of the amplitude values in an orderly rectangular pixel grid.

6. The method according to claim 5, wherein for an interpolation for each pixel of the pixel grid the amplitude values of the natural neighbors (q1 ... q5) of the pixel are used.

7. The method according to claim 6, wherein a luminosity value of the pixel is formed from the sum of the weighted amplitude values of the natural neighbors (q1 ... q5), wherein the weighting factors are based on ratios of the Voronoi cells of the natural neighbors and the pixel.

8. A method for generating imaging parameters of an optical fiber of a fiber bundle from a plurality of optical fibers, wherein the imaging parameters describe geometrical characteristics of an intensity course generated by the optical fiber on the sensor, comprising:
    capturing an intensity distribution generated by the optical fiber on the sensor;
    determining the imaging parameters by fitting a function of the imaging parameters and an amplitude value to the intensity distribution in a preliminary imaging environment whose extension depends on the nature of the optical fiber; and
    storing only the imaging parameters when location information in the imaging parameters allow a conclusion to the fiber position, which comprises a predetermined minimum distance to an optical fiber position of the remaining fibers.

9. The method according to claim 8, wherein the step of determining the imaging parameters comprises an additional step of preselection, wherein the preliminary imaging environment is determined by a comparison of a predetermined reference intensity distribution to the intensity distribution, so that when reaching a predetermined reference criterion a comparison environment in which the predetermined reference intensity distribution is predetermined is the preliminary imaging area.

10. The method according to claim 9, wherein the reference criterion is undergoing a predetermined square distance between the intensity distribution and the predetermined reference intensity distribution within the comparison environment.

11. The method according to claim 8, wherein a geometrical extension of the preliminary imaging area is less than 1.1 times the diameter of a cylindrical optical fiber.

12. The method according to claim 8, wherein the imaging parameters are stored when location information in the imaging parameters allow a conclusion to the optical fiber position whose distance to an optical fiber position of the remaining optical fibers is greater than 0.9 times the diameter of a cylindrical optical fiber.

13. The method according to claim 8, wherein, when determining the imaging parameters, the location coordinates σx and σy, the width parameters σx and σy and an amplitude value a of the following parameterization $$f(x, y; v) = a \cdot \exp\left(-\frac{(x-\mu_x)^2}{2\sigma_x^2} - \frac{(y-\mu_y)^2}{2\sigma_y^2}\right),$$

are varied to fit the function to the intensity distribution.

14. The method according to claim 13, wherein, when storing the imaging parameters, the parameters μx, μy, σx and σy are stored.

15. The method according to claim 10, wherein the sensor has a sensor resolution, which is higher than the optical fiber resolution depending on a geometrical extension of the optical fiber, and wherein the imaging parameters are determined with an accuracy which is higher than the sensor resolution.

* * * * *